(12) United States Patent
Stevens et al.

(10) Patent No.: US 10,866,432 B2
(45) Date of Patent: Dec. 15, 2020

(54) ADJUSTABLE FLUID-FILLED LENS ASSEMBLY AND METHOD FOR ASSEMBLING THE SAME

(71) Applicant: ADLENS LTD, Eynsham (GB)

(72) Inventors: Robert Edward Stevens, Woodstock (GB); Thomas Jacoby, Woodstock (GB); Derek Paul Forbes Bean, Northants (GB); William Guest, Oxford (GB); Jon Nisper, Grand Rapids, MI (US); Tom Worsley, Chipping Norton (GB); Ashutosh Kumar, Hertfordshire (GB); Richard Wilhelm Janse Van Rensburg, Hertfordshire (GB); Peter Lee Crossley, Hertfordshire (GB); Rita Stella, Hertfordshire (GB)

(73) Assignee: ADLENS LTD, Eynsham (GB)

( * ) Notice: Subject to any disclaimer, the term of this patent is extended or adjusted under 35 U.S.C. 154(b) by 295 days.

(21) Appl. No.: 15/763,393

(22) PCT Filed: Sep. 28, 2016

(86) PCT No.: PCT/GB2016/000173
§ 371 (c)(1),
(2) Date: Mar. 26, 2018

(87) PCT Pub. No.: WO2017/055787
PCT Pub. Date: Apr. 6, 2017

(65) Prior Publication Data
US 2019/0258084 A1    Aug. 22, 2019

(30) Foreign Application Priority Data
Sep. 28, 2015 (GB) .................... 1517160.6

(51) Int. Cl.
*G02C 3/00* (2006.01)
*G02C 5/00* (2006.01)
(Continued)

(52) U.S. Cl.
CPC ........ *G02C 7/085* (2013.01); *B29D 11/00009* (2013.01); *G02B 3/12* (2013.01);
(Continued)

(58) Field of Classification Search
CPC . G02B 3/14; G02C 7/042; G02C 7/02; G02C 5/00; G02C 7/04; B82Y 20/00; H04N 9/3197; G02F 1/03
(Continued)

(56) References Cited

U.S. PATENT DOCUMENTS 5,371,629 A    12/1994 Kurtin et al.
7,256,943 B1    8/2007 Kobrin et al.
(Continued)

FOREIGN PATENT DOCUMENTS

WO    9947948 A1    9/1999
WO    2012021688 A1    2/2012
(Continued)

OTHER PUBLICATIONS

International Search Report and Written Opinion in PCT/GB2016/000173 dated Jun. 9, 2017, 23 pages.
(Continued)

*Primary Examiner* — Dawayne Pinkney
(74) *Attorney, Agent, or Firm* — Rothwell, Figg, Ernst & Manbeck, P.C.

(57) ABSTRACT

A method of assembling an adjustable fluid-filled lens assembly comprising biaxially tensioning an elastomeric membrane to a surface tension of greater than 180 N/m, typically greater than 1000 N/m; thermally conditioning the tensioned membrane, e.g., for one hour at a temperature of
(Continued)

about 80° C., to accelerate relaxation of the membrane; mounting the membrane to a peripheral support structure whilst maintaining the tension in the membrane; assembling the mounted membrane with one or more other components to form an enclosure with the membrane forming one wall of the enclosure; and thereafter filling the enclosure with a fluid. The membrane may be formed from an aromatic polyurethane, and the fluid may be a phenylated siloxane. In some embodiments, the membrane is able to hold a substantially constant surface tension of at least 180 N/m for a period of at least 12 months.

17 Claims, 9 Drawing Sheets

(51) Int. Cl.
*G02C 7/02* (2006.01)
*G02C 7/00* (2006.01)
*G02F 1/03* (2006.01)
*G02B 1/06* (2006.01)
*G02C 7/08* (2006.01)
*B29D 11/00* (2006.01)
*G02B 3/12* (2006.01)
*G02B 3/14* (2006.01)
*B29K 75/00* (2006.01)

(52) U.S. Cl.
CPC ............ *G02B 3/14* (2013.01); *B29K 2075/00* (2013.01); *B29K 2995/0093* (2013.01)

(58) Field of Classification Search
USPC ................................... 359/245–247, 665–666
See application file for complete search history.

(56) References Cited

U.S. PATENT DOCUMENTS

| 7,533,577 | B1* | 5/2009 | Feng ........................ G01N 3/10 |
| | | | 73/150 A |
| 8,111,464 | B2 | 2/2012 | Lee et al. |
| 8,254,034 | B1 | 8/2012 | Shields et al. |
| 2004/0156983 | A1 | 8/2004 | Moravec et al. |
| 2008/0207846 | A1 | 8/2008 | Henze et al. |
| 2009/0035596 | A1* | 2/2009 | Higashi ................. B29C 55/143 |
| | | | 428/480 |
| 2011/0059466 | A1* | 3/2011 | Kameyama .............. C07K 1/26 |
| | | | 435/7.9 |
| 2011/0085131 | A1 | 4/2011 | Gupta et al. |
| 2016/0033690 | A1* | 2/2016 | Henriksen ............. G02B 1/041 |
| | | | 359/666 |

FOREIGN PATENT DOCUMENTS

| WO | 2013143630 A1 | 10/2013 |
| WO | 2013144592 A1 | 10/2013 |
| WO | 2013158295 A1 | 10/2013 |

OTHER PUBLICATIONS

International Preliminary Report on Patentabilty in PCT/GB2016/000173 dated Jan. 26, 2018, 16 pages.

* cited by examiner

ADJUSTABLE FLUID-FILLED LENS ASSEMBLY AND METHOD FOR ASSEMBLING THE SAME

RELATED APPLICATIONS

This application is a national stage application, filed under 35 U.S.C. § 371, of International Application No. PCT/GB2016/000173, filed on Sep. 28, 2016, which claims the benefit of, and priority to, U.K. Application No. 1517160.6, filed Sep. 28, 2015. The contents of each of these applications are expressly incorporated herein by reference in their entireties.

The present invention relates to an adjustable fluid-filled lens assembly comprising a stretched elastomeric membrane, one face of the membrane forming a lens surface and the reverse face being disposed contiguously in contact with a body of incompressible fluid for controlling the shape of the membrane, and has particular reference to a method of assembling such an adjustable fluid-filled lens assembly in which the membrane is capable of holding tension for an extended period of use. In another aspect, the present invention provides a method of forming a hard coating on one face of the membrane of such an adjustable fluid-filled lens assembly, and has particular reference to an adjustable fluid-filled lens assembly comprising a pre-tensioned elastomeric membrane having a coating on at least one face thereof which is in compression to alleviate at least partially the force applied by the tensioned membrane on a peripheral supporting structure such as one or more bendable rings that hold the membrane around its edge.

Adjustable fluid-filled lens assemblies are known from WO 96/38744 A1, WO 98/11458 A1, WO 99/47948 A1, WO 01/75510 A1, WO 02/063353 A2, WO 2006/055366 A1, WO 2007/0490582, WO 2008/007077 A1, WO 2008/050114 A1, WO 2009/125184 A2, WO 2013/144533 A1, WO 2013/144592 A1, WO 2015/044260 A1, U.S. Pat. Nos. 5,371,629 A and 6,040,947 A. According to each of these disclosures, a transparent, elastic membrane is held under tension in contact with a body of fluid for controlling the shape of the membrane. Generally, the fluid is contained within a sealed enclosure, and the membrane forms one wall of the enclosure. The membrane has an inner face that contacts the fluid contiguously and an outer face that forms an optical surface of the lens, with the optical power of the lens being related to the curvature of the membrane.

In one type of adjustable fluid-filled lens ("fluid injection"), as disclosed in WO 91/17463 A1, WO 96/38744 A1, WO 98/11458 A1, WO 99/47948 A1, WO 01/75510 A1, WO 02/063353 A2, WO 2007/0490582, WO 2008/007077 A1, WO 2008/050114 A1 or WO 2009/125184 A2, an adjusting amount fluid is selectively injected into or withdrawn from the enclosure to cause the membrane to distend outwardly or contract inwardly of the enclosure for adjusting the curvature of the membrane. In another type of adjustable fluid-filled lens ("fluid compression"), as disclosed in WO 91/17463 A1, WO 2006/055366 A1, WO 2013/144533 A1, WO 2013/144592 A1, WO 2015/044260 A1, U.S. Pat. No. 5,371,629 A or U.S. Pat. No. 6,040,947 A, the volume of fluid remains constant, but the enclosure is compressible, so that the distribution of the fluid within the enclosure can be adjusted by compressing or expanding the enclosure to cause the elastic membrane to distend outwardly or contract inwardly.

It is known in the art to coat lenses with a variety of different types of functional coating, including anti-scratch, anti-UV, anti-reflective and tinted coatings. Fluorinated polymer materials such, for example, as OF 210 (Canon Optron, Inc.), can be applied by vapour deposition to form hydrophobic and/or oleophobic coatings.

Adjustable fluid-filled lens assemblies may be used in eyeglasses to allow the optical power of one or both lenses to be adjusted. In some eyeglasses with adjustable lenses, a selectively operable control mechanism associated with one or both lenses may be provided to allow the wearer to adjust their optical power continually. The use of such lenses in eyeglasses imposes a number of special requirements on the materials that may be used for the membrane. In particular, in addition to being thin, elastic and transparent (at least across the visible spectrum), the membrane material must also be colourless and be of low toxicity and low volatility; it should be inert, stable at high temperatures and exhibit no phase changes within its normal range of operating temperatures. It should also exhibit low microbial growth. Further, the membrane material must be capable of forming an accurate and stable optical surface. Ideally, but not essentially, the membrane material may also have a refractive index that is the same or similar to that of the fluid. Suitably the fluid has a high refractive index (ideally at least about 1.45 or above 1.5, e.g., around 1.58±0.02) so the lens is not unduly thick.

When used in eyeglasses, the elastic membrane is generally used in an upright orientation giving rise to a hydrostatic pressure gradient within the body of fluid; it may be subject to temperature variations of up to about 50° C. and movement when the wearer moves. Desirably, the membrane should be pre-tensioned to a surface tension that is great enough to reduce to an optically imperceptible level the variation in optical power from top to bottom of the lens caused by the hydrostatic pressure gradient within the fluid and displacement of the fluid within the enclosure owing to inertia as the wearer moves. The membrane should be capable of holding this tension stably to provide a substantially constant load for an extended period of time, at least equal to the expected life of the eyeglasses, which would normally be of the order of years, despite being subject to fluctuations in the surrounding temperature and being held in constant contact with the fluid.

WO 2013/144592 A1 and WO 2015/044260 A1 disclose polyethylene terephthalate (e.g. Mylar®), polyesters, silicone elastomers (e.g. polydimethylsiloxane), thermoplastic polyurethanes, including cross-linked polyurethanes (e.g. Tuftane®), as suitable membrane materials for use in an adjustable lens assembly and silicone oils such, for example, as trimethylpentaphenyltrisiloxane and tetramethyltetraphenyltrisiloxane as suitable fluids. Thermoplastic polyurethane in particular satisfies many of the special requirements mentioned above, making it eminently suitable for use as a membrane in an adjustable lens. A problem with thermoplastic polyurethane however, is that silicone oils penetrate into the membrane material, causing the membrane to swell and lose tension.

It is an object of the present invention to provide an adjustable fluid-filled lens assembly of the kind described above, in which the membrane is capable of holding a constant surface tension that is sufficient to reduce to an optically imperceptible level any variation in optical power across the lens resulting from an hydrostatic pressure gradient within the fluid and any displacement of the fluid within the enclosure owing to inertial effects for a period of at least 12 months. Preferably the membrane is capable of holding this surface tension, even if the lens assembly is subjected to temperature fluctuations of 50° C.

In accordance with a first aspect of the present invention, there is provided method of assembling an adjustable fluid-filled lens assembly comprising biaxially tensioning an elastomeric membrane to a surface tension of greater than 180 N/m; thermally conditioning the tensioned membrane to accelerate relaxation of the membrane; mounting the membrane to a peripheral support structure whilst maintaining the tension in the membrane; assembling the mounted membrane with one or more other components to form an enclosure with the membrane forming one wall of the enclosure; and thereafter filling the enclosure with a fluid.

The membrane may be biaxially tensioned to an initial surface tension of at least 450 N/m or at least 500 N/m. In some embodiments, the membrane may be biaxially tensioned to an initial surface tension of at least 1000 N/m. For example, the membrane may be biaxially tensioned to an initial surface tension of about 1200 N/m.

In some embodiments, the membrane may be conditioned at a temperature of at least 70° C. or at least 80° C. The membrane may be conditioned for at least 30 minutes, or at least 60 minutes. The thermal conditioning step is suitably carried out before mounting the membrane to the support structure.

Thermal conditioning of the membrane may serve to accelerate relaxation of the membrane. After thermal conditioning, the membrane may have a residual surface tension in the range about 180-550 N/m, depending on the initial surface tension of the membrane, the properties of the membrane material and the specific conditions of the thermal conditioning step.

The membrane may be coated on at least one face with a barrier material to form a barrier layer that may serve to prevent or retard the passage of the fluid. In some embodiments, the barrier material may be coated on an inner face of the membrane that contacts the fluid in the finished assembly. In this arrangement, the barrier layer may serve to prevent or retard the passage of the fluid into the membrane.

Alternatively, the barrier material may be coated as a protective layer on an outer face of the membrane that is arranged outside the enclosure in the finished assembly, not in direct contact the fluid in the enclosure. In some embodiments, the outer face of the membrane may be exposed to the air. The membrane may be left uncoated with a barrier material on its inner face, so that the fluid may penetrate into the membrane material. By providing a protective layer on the outer face of the membrane, any fluid that penetrates into the membrane from the enclosure is prevented from leaking out of the membrane via its outer face, which would be undesirable because it might impair the optical qualities of the lens, for instance by forming droplets on the outer surface.

The barrier material may be applied to the inner or outer face of the mounted membrane as disclosed above after the thermal conditioning step. Conveniently, the material may be coated onto the mounted membrane before it is assembled with the other components to form the enclosure. If desired, other coatings, such, for example, as an anti-reflection coating may be applied to the outer face of the membrane at this stage. Such other coatings may be single layer or multi-layer coatings, as is known in the art.

The barrier material may comprise any suitable material for preventing or retarding the passage of fluid. The choice of barrier material may depend on the particular fluid used. The refractive index of the barrier material is not important unless it is anti-reflective and/or thick enough to improve the surface quality of the membrane such, for example, as a self-levelling coating that is index-matched to the membrane. It should be capable of adhering well to the membrane and it should be non-yellowing. Desirably the barrier layer should be as thin as possible. In some embodiments the barrier layer may have a thickness of less than 20 nm, e.g. about 10 nm. In some embodiments, the barrier material may comprise a fluorinated polymer or a hydrophobic (oleophobic) polymer. Suitably said barrier material may selected from ethylene vinyl alcohol (EVOH), polyvinylidene chloride (PVDC), silicone oxide (SiOx), polyacrylate, inorganic based coatings (e.g., MgF2) and doped polymers (e.g., C-doped PTFE). Fluorine based polymeric homologues of PTFE such, for example, as OF 210, which is commercially available from Canon Optron, Inc., are preferred.

In a particular aspect of the present invention as described in more detail below, the barrier material may comprise a functionalized polymer such, for example, as an acrylate terminated polyurethane. In some embodiments, the barrier material may comprise a filler such as nanoparticulate silica. In some embodiments, the barrier material may comprise an acrylic modified polyurethane silica hybrid coating.

The barrier material may be applied to the inner or outer face of the membrane by a variety of different techniques known in the art, but in some embodiments physical vapour deposition (PVD) may be used under vacuum. A coating of an acrylic-modified polyurethane barrier material may be applied to a face of the membrane by ultrasonic spraying to achieve a thickness in the range 0.5 μm-1.5 μm.

In embodiments in which the fluid is permitted to penetrate into the membrane material, for instance embodiments in which the inner face of the membrane is free of any barrier layer, the passage of fluid into the membrane material may cause the membrane progressively to swell and relax, equivalent to a strain unloading of up to about 5%. The membrane may absorb up to about 20% of its own weight of fluid. In such embodiments, the initial surface tension of the membrane may be selected such that after thermal conditioning, the residual surface tension drops to about 350-550 N/m. As the fluid penetrates into the membrane material, the surface tension in the membrane may fall further. This is acceptable, provided the surface tension remains above about 180 N/m. In some embodiments, the surface tension of the membrane may stabilise after the ingress of fluid into the membrane material at a final surface tension in the range about 180-300 N/m, preferably 200-300 N/m.

In some embodiments, the finished assembly may be incubated at a temperature of at least about 40° C. to accelerate absorption of the fluid by the membrane. In some embodiments, the finished assembly may be incubated at a temperature of about 50-51° C. Suitably the finished assembly may be incubated for a period of at least about 12 hours, preferably 24 hours.

Advantageously, it has been found that the membrane when biaxially tensioned and thermally conditioned in accordance with the method of the present invention is able to hold a sufficiently constant tension of at least about 180 N/m for a period of at least 12 months, typically at least two years, even when disposed in continuous contact with the fluid and subjected to a variation in operating temperatures of about 50° C. By "sufficiently constant" herein is meant that the tension in the membrane varies by no more than about 25%, preferably no more than 20%, over the period.

According to a second aspect of the present invention, there is provided an adjustable fluid-filled lens assembly comprising a fluid-filled enclosure, one wall of which is formed by a tensioned elastomeric membrane that is mounted to a peripheral support structure; wherein the membrane is saturated with said fluid, is coated on its outer face with a barrier layer to said fluid, and the membrane holds a substantially constant surface tension of at least 180 N/m.

As mentioned above the membrane may hold up to about 20% fluid by weight of the membrane.

According to a third aspect of the present invention, there is provided an adjustable fluid-filled lens assembly comprising a fluid-filled enclosure, one wall of which is formed by a tensioned elastomeric membrane that is mounted to a peripheral support structure; wherein the membrane is coated on its inner face with a barrier layer to said fluid, and the membrane holds a substantially constant surface tension of at least 180 N/m.

Typically the membrane of the adjustable fluid-filled lens assembly of the third aspect of the invention is free of fluid.

In some embodiments, the membrane may hold a substantially constant surface tension of at least 180 N/m for a period of at least 12 months. As mentioned above, by this is meant that the surface tension of the membrane does not vary by more than about 20% over this period.

Suitably, the membrane material should have a glass transition temperature below the usual operating range of the lens, preferably below about −5° C., and an elastic modulus in the range 10-200 MPa. The membrane should be optically clear and non-toxic. In some embodiments, the membrane may have a refractive index of about 1.5. Various suitable polymer materials are available to those skilled in the art, including cross-linked urethanes and silicone elastomers, e.g., poly (dimethylsiloxane). Thermoplastic aromatic polyurethanes (TPUs) are particularly preferred.

Thermoplastic polyurethanes are made up of block copolymer molecules bisegmented hard and soft zones corresponding respectively to crystalline and amorphous regions. It is this combination of flexible, amorphous segments with a high extensibility and low glass transition temperature, on the one hand, and rigid crystalline segments with a high melting point, on the other hand, that gives the material its elastomeric nature. By altering the ratio of the crystalline phase, it is possible to vary properties such as hardness, strength, rigidity, extensibility and low-temperature flexibility over a broad range. Suitably, the membrane may be formed from a sheet of aromatic polyurethane, which also has good microbe resistance. In some embodiments the polyurethane sheet may advantageously consist of a polyether or polyester aromatic polyurethane.

Thermoplastic polyurethanes can be produced by reacting (a) isocyanates with (b) compounds that are reactive toward isocyanates and have a molecular weight of from 500 to 10,000 and, if appropriate, (c) chain extenders having a molecular weight of from 50 to 499, if appropriate in the presence of (d) catalysts and/or (e) customary auxiliaries, as disclosed in US 2008/0207846 A1, the contents of which are incorporated herein by reference.

As organic isocyanates (a), it is possible to use generally known aromatic, aliphatic, cycloaliphatic and/or araliphatic isocyanates, preferably diisocyanates; for example diphenylmethane 2,2'-, 2,4'- and/or 4,4'-diisocyanate (MDI).

As compounds (b) which are reactive toward isocyanates, it is possible to use generally known compounds, such as diols and diamines, which are reactive toward isocyanates; for example polyetherols, which are usually referred to as "polyols", having molecular weights of from 500 to 12,000 g/mol, preferably from 600 to 6,000 g/mol, in particular from 800 to 4000 g/mol, and preferably a mean functionality of from 1.8 to 2.3, preferably from 1.9 to 2.2, in particular 2. A preferred polyol is polytetramethyleneglycol (PTMG).

As chain extenders (c), it is possible to use generally known aliphatic, araliphatic, aromatic and/or cycloaliphatic compounds having a molecular weight of from 50 to 499, preferably 2-functional compounds; for example alkanediols having from 2 to 10 carbon atoms in the alkylene radical, in particular 1,4-butanediol.

To set the hardness of the TPUs, the molar ratios of the formative components (b) and (c) can be varied within a relatively wide range. Molar ratios of component (b) to total chain extenders (c) to be used of from 10:1 to 1:10, in particular from 1:1 to 1:4, have been found to be useful, with the hardness of the TPUs increasing with increasing content of (c).

Preferred TPUs are obtainable by reacting (a) isocyanates with (b) polyether diols having a melting point of less than about 150° C. and a molecular weight of from 501 to 8000 g/mol and, if appropriate, (c) diols having a molecular weight of from 62 g/mol to 500 g/mol. Particular preference is given to thermoplastic polyurethanes in which the molar ratio of the diols (c) having a molecular weight of from 62 g/mol to 500 g/mol to the component (b) is less than 0.2, particularly preferably from 0.1 to 0.01.

A particularly preferred polyether polyurethane for use in the membrane of the lens assemblies of the present invention is formed from diphenylmethane-4,4'-diisocyanate (MDI), polytetramethylene glycol and 1,4-butanediol having a Shore A hardness of about 86, a density of about 1.12 g/cm3, a tensile strength of about 33 MPa and a tear strength of about 105 N/mm. This material is commercially available from BASF under the trade mark Elastollan® 1185.

Generally, the fluid should be substantially incompressible. It should be transparent and colourless, with a refractive index of at least about 1.5. Suitably the refractive index of the membrane and fluid should be matched, so that the interface between the membrane and fluid is substantially imperceptible to the user. The fluid should have low toxicity and low volatility; it should be inert and exhibit no phase change above about −10° C. or below about 100° C. The fluid should be stable at high temperatures and exhibit low microbial growth. In some embodiments, the fluid may have a density of about 1 g/cm3.

Various suitable fluids are available to those skilled in the art, including silicone oils and siloxanes such, for example, as phenylated siloxanes. A preferred fluid is pentaphenyltrimethyltrisiloxane.

In some embodiments, the membrane may suitably comprise a polyether polyurethane such, for example, as the above-mentioned material available under the trade mark Elastollan® 1185, and the fluid may comprise a silicone oil or phenylated siloxane, such as pentaphenyltrimethyltrisiloxane. The refractive indexes of the membrane material and fluid are suitably the same or substantially the same and are at least 1.5.

In addition to the membrane, the enclosure may comprise a receptacle for receiving the fluid. The receptacle may be closed by the membrane, which forms one wall of the enclosure. The receptacle is suitably made from a material that is optically clear and colourless and has a refractive index of at least about 1.5. The refractive index of the receptacle is suitably matched to the refractive index of the membrane fluid, so that the boundary between the receptacle and the fluid is substantially imperceptible to the user. In some embodiments, the receptacle may be rigid, for instance when the fluid-filled lens assembly of the present invention is of the "fluid injection" type. Alternatively, the receptacle may be compressible, particularly when the lens assembly of the invention is of the "compression" type. In the latter case, the receptacle may comprise a flexible peripheral wall that may buckle in the manner of bellows to allow the receptacle to be compressed. A suitable flexible material is a transparent, thermoplastic polyurethane such, for example, as Tuftane®.

In some embodiments, the peripheral support structure for the membrane may comprise one or more rings that are arranged to hold the membrane around its edge. The ring or rings may be substantially rigid or they may be bendable. In some embodiments, the membrane may be non-circular, and the ring or rings for supporting the membrane may be bendable to allow displacement of the edge of the membrane out of plane when the assembly is actuated, to cause or allow the membrane to distend or contract spherically or according to another Zernike polynomial of the kind typically used in optical or ophthalmic applications.

A problem that may arise in some embodiments that include one or more bendable rings as part of the peripheral support structure for the membrane is that the surface tension in the membrane may tend to cause unwanted in-plane bending of the one or more rings, as opposed to out of plane bending which is required, as mentioned in the preceding paragraph, to allow displacement of the edge of the membrane when the assembly is actuated to cause or allow the membrane to distend or contract spherically or in accordance with one or more other Zernike polynomials. WO 2013/143630 A1 discloses a deformable membrane assembly comprising one or more bending controllers acting on a bendable membrane supporting member to control in-plane bending of the supporting member in response to loading through tension in the membrane. Whilst the bending controllers of WO 2013/143630 A1 are satisfactory, they require additional components of the assembly, which adds to its complexity and cost of manufacture. They also take up significant volume and weight within the assembly.

A different object of the present invention therefore is to provide an improved way of controlling the in-plane bending of the bendable ring or rings of the peripheral support structure, which is simpler to manufacture and occupies less volume and/or weight in the finished assembly.

In accordance with a fourth aspect of the present invention, therefore, there is provided an adjustable fluid-filled lens assembly comprising a fluid-filled enclosure, one wall of which is formed by a tensioned elastomeric membrane that is mounted to a peripheral support structure comprising one or more bendable rings arranged to hold the membrane around its edge; wherein the membrane is coated on at least one of its inner and outer faces with a coating that is formed of a material having a higher modulus than the membrane and is disposed under compression to counteract the tension in the membrane and thereby at least partially alleviate the in-plane force applied by the membrane to the one or more rings. In some embodiments, the one or more rings may be non-circular.

As mentioned above, the membrane may suitably have an elastic modulus in the range 10-200 MPa.

The membrane may have a thickness in the finished fluid-filled lens assembly in the range 100-300 µm. In some embodiments the membrane may have a thickness in the range 150-250 µm, preferably about 200-220 µm. As mentioned above, the membrane may hold tension in the finished assembly in the range 180-300 N/m, preferably 200-300 N/m.

The coating may have an elastic modulus between one and two orders of magnitude greater than the elastic modulus of the membrane. For instance, the coating may have an elastic modulus of at least 0.1 GPa, suitably at least 0.5 GPa, and more suitably at least 0.75 GPa or 1 GPa. In some embodiments, the coating may have an elastic modulus of about 1 GPa.

The thickness of the coating may be calculated to provide a substantial alleviation (reduction) in the tension that is applied to the bendable ring or rings. In most embodiments, a coating having a thickness that is calculated to counteract completely the surface tension in the membrane would be undesirably thick, but a coating having a thickness in the range 0.5-1.5 µm, for example 1 µm, may be sufficient still to have a significant effect on the mechanics of the membrane. In some embodiments the coating may have a thickness in the range 1-1.5 µm, preferably 1.2-1.5 µm.

Suitably, the coating may be formed from a material that is compatible with the membrane material to provide strong interfacial forces between the face of the membrane and the coating. As mentioned above, thermoplastic aromatic polyurethanes (TPUs) are preferred materials for the elastomeric membrane. TPUs are hydrophobic, and a problem with using another hydrophobic coating material such as a fluorinated polymer applied by PVD, for example, is that there are no interfacial bonds and, as a result, the PVD coating is fragile.

In accordance with the present invention, the coating may also comprise a polyurethane material that is capable of forming strong interfacial bonds with the membrane. Advantageously, the polyurethane coating material may comprise cross-linkable acrylate groups to allow the coating to be cured after application to the membrane. The coating material may comprise an acrylic-modified polyurethane such, for example, as a polyether or polyester polyurethane acrylate. In some embodiments, the coating material may comprise an acrylic-modified aliphatic or aromatic polyurethane. A polyurethane coating may also be used with other membrane materials of the kinds mentioned above, including for example siloxane membranes.

Examples of suitable polyester urethane acrylates include products formed by the reaction of an hydroxyl functional polyester acrylate with an isocyanate functional material. Polyester acrylates may include reaction products of polyester polyols with acrylic acid.

Suitable isocyanate functional components include hexamethylene diisocyanate, isophorone diisocyanate, isocyanate functional acrylic polymers and polyurethanes, reaction products of hydroxyl functional components (e.g. polyethylene glycol, poly-propylene glycol and di-, tri- and higher hydroxy functionality aliphatic alcohols (e.g. glycerol and trimethylolpropane) and their ethoxylated, propoxylated and polycaprolactone analogs) with di-, tri- and etc. isocyanates (e.g. hexamethylene diisocyanate, isophorone diisocyanate and toluene diisocyanate (TDI)).

Specific examples of suitable polyurethane acrylate coating materials are RAYCRON® CeranoShield UV Clearcoat and G-NT200, which are commercially available from PPG Industries, Inc., Barberton Speciality Chemicals Plant of Barberton, Ohio, and Lens Technology International of La Mirada, Calif., respectively.

Advantageously, the coating material may comprise nanoparticulate silica to afford additional stiffness. The silica filler may also provide scratch-resistance. Advantageously, the coating material may comprise 50-60% wt. silica, e.g. about 52% wt., but in some embodiments a silica concentration of about 25% wt. may suffice. In some embodiments the coating material may be diluted with an appropriate solvent to achieve a thinner coating on the membrane, for instance in the range 0.4-0.5 µm. The choice of solvent will vary according to the selected coating material, but typically an acetate or alcohol may be used. In such cases the concentration of silica may be reduced by dilution to 7-10% wt.

The polyurethane acrylate coating material may further comprise a suitable photoinitiator such, for example, as a free radical photoinitiator.

The polyurethane coating material may be applied to the face of the membrane by ultrasonic spraying, which has been found to achieve a thickness well below 1 μm if desired. In ultrasonic spraying, a mass of liquid is atomised to form tiny droplets which are then sprayed over a substrate in the form of a thin film.

In accordance with a fifth aspect of the present invention therefore there is provided a method of assembling an adjustable fluid-filled lens assembly comprising biaxially tensioning an elastomeric membrane; thermally conditioning the tensioned membrane to accelerate relaxation of the membrane; mounting the membrane to a peripheral support structure whilst maintaining the tension in the membrane; coating a face of the membrane with a cross-linkable polyurethane acrylate coating material; curing the coating material; assembling the mounted membrane with one or more other components to form an enclosure with the membrane forming one wall of the enclosure; and thereafter filling the enclosure with a fluid.

The membrane may be formed from any suitable elastomeric material as disclosed above, including cross-linked urethanes and siloxane elastomers, e.g., poly (dimethylsiloxane). Thermoplastic aromatic polyurethanes (TPUs) are particularly preferred.

As described above, the membrane may be tensioned to an initial surface tension of about 1200 N/m. After thermal conditioning, the membrane may have a residual surface tension in the range about 180-550 N/m.

Advantageously, the coating material may comprise a nanoparticulate silica filler as described above and, when cured, may have an elastic modulus of at least 0.5 GPa. The coating may be applied to the face of the membrane to a thickness of about 0.5-1.5 μm. Suitably the coating may be applied to the outer face of the membrane to impart scratch resistance and cleanability to the assembly.

Advantageously, the face of the membrane may be activated prior to application of the coating material to reduce the contact angle of the face to allow better adhesion of the coating material. Suitably the membrane face may be activated by plasma treatment, for example air plasma. Thermoplastic polyurethane is hydrophobic in nature and has a typical contact angle in the range 95-105°. Activating a thermoplastic polyurethane membrane face by plasma treatment reduces the contact angle to about 78-83°.

After applying the coating material to the face of the membrane, the coating material may be cured. Suitably UV exposure may be employed for this purpose. For example, curing may be effected using Mercury vapour H-Bulb which outputs UV light in the range 220-320 nm, with a spike in the longwave range of 365 nm. Curing proceeds by activation of the photoinitiator within the coating, which triggers cross-linking of the acrylate moieties within the polyurethane acrylate material, resulting in a hard coating on the face of the membrane.

After applying the coating, assembling the mounted membrane with one or more other components to form the enclosure and filling the enclosure with the fluid, the finished assembly may be incubated at a temperature of at least about 40° C., as described above, allowing the membrane to relax slightly, thereby causing the coating to be compressed as described above. Compression of the coating may act to resist further relaxation of the membrane, thereby reducing the in-plane force applied by the membrane to the peripheral supporting structure for the membrane.

Suitably the adjustable fluid-filled lens assembly of the invention may be used in a pair of spectacles. Accordingly, the present invention provides, in a sixth aspect, a pair of spectacles comprising at least one adjustable fluid-filled lens assembly in accordance with the invention.

Following is a description by way of example only of embodiments of the present invention.

Figure 1:
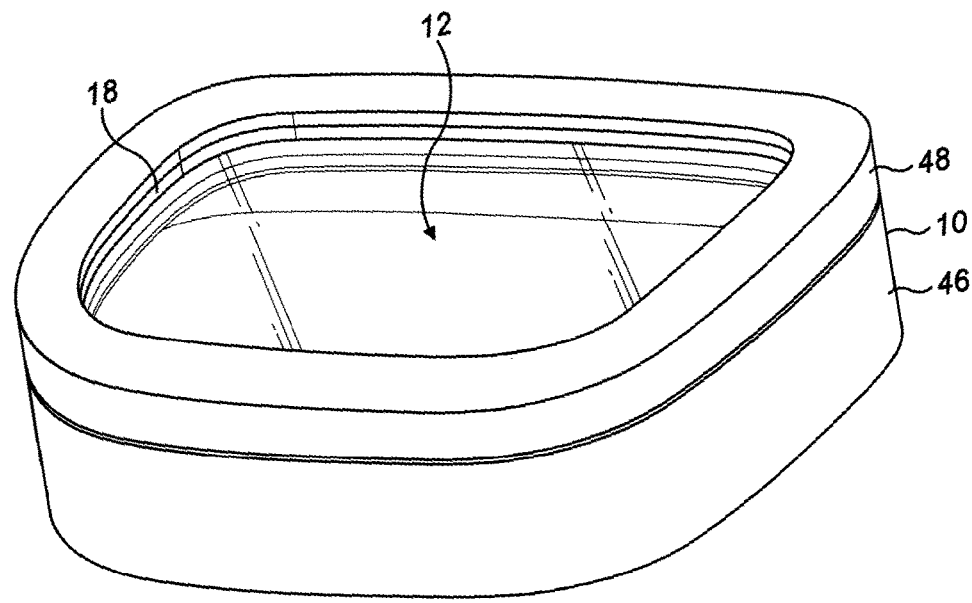
FIG. 1 is a schematic perspective view of an adjustable fluid-filled lens assembly according to the present invention.
Figure 2:
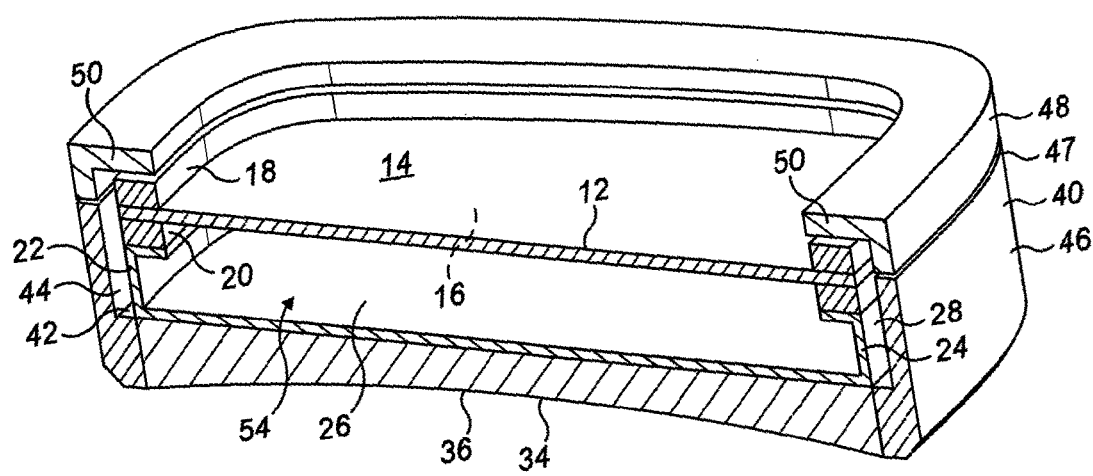
FIG. 2 is a schematic perspective view of the adjustable fluid-filled lens assembly of FIG. 1 shown in cross-section.
Figure 3:
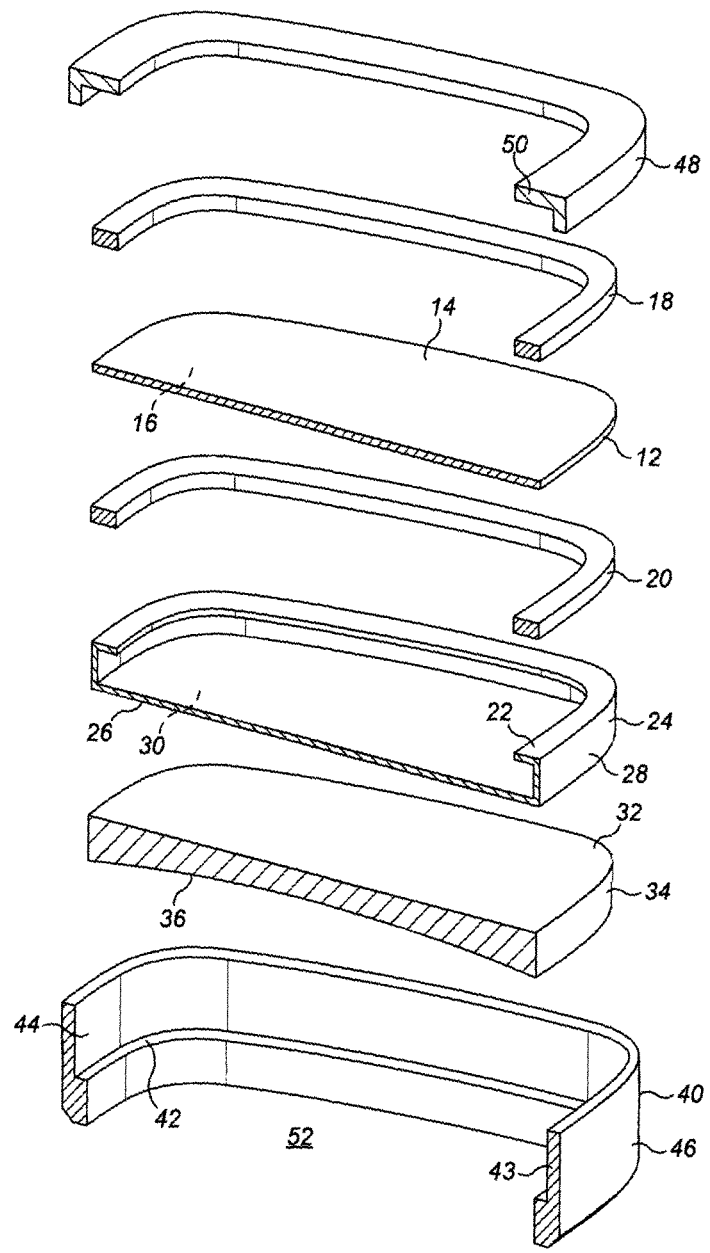
FIG. 3 is a schematic exploded view showing in cross-section the components of the lens assembly of FIG. 1.

FIGS. 1, 2 and 3 show schematically an adjustable fluid-filled lens assembly 10 of the kind known in the art. The lens assembly 10 of FIGS. 1 to 3 is of the "compression type" referred to above, in that it comprises a body of incompressible fluid 60 of fixed volume, and the focal power of the lens is controlled by compression of the assembly 10 in the manner described below to redistribute the fluid behind a thin, elastic membrane 12 membrane to cause the membrane to distend or contract thereby changing its curvature. The present invention is equally applicable to adjustable fluid-filled lens assemblies of the "fluid injection type", which also comprise a similar membrane.

Only the parts of the assembly that are directly relevant to the present invention are shown in the interests of brevity. Additional features, such for example as the control mechanism for selectively controlling the refractive power of the assembly 10 are briefly mentioned below, but are omitted from the drawings.

As shown in FIGS. 2 and 3, the membrane 12 has an outer front face 14 and an inner rear face 16 and is stretched and mounted between a front ring 18 and a rear ring 20, which serve as a peripheral support structure for the membrane 12, holding the membrane 12 under tension around its edge as described in more detail below.

The membrane 12 comprises a sheet of a thermoplastic polyurethane. In the present embodiment, the membrane comprises a sheet cf a polyether polyurethane formed from diphenylmethane-4,4'-diisocyanate (MDI), polytetramethylene glycol and 1,4-butanediol having a Shore A hardness of about 86, a density of about 1.12 g/cm$^3$, a tensile strength of about 33 MPa and a tear strength of about 105 N/mm. This material is commercially available from BASF under the trade mark Elastollan® 1185A10. The sheet has an initial thickness of about 380 μm, but in the finished assembly has a thickness of about 220 μm, as described in more detail below. Other grades of thermoplastic polyurethanes may be used; for instance, a polyether polyurethane in which the relative proportions (stoichiometry) of the isocyanate, polyol and chain extender components are varied to afford a different a Shore hardness. Alternatively, the membrane may comprise a polyether polyurethane made from a different isocyanate, polyol and/or chain extender. More generally, the membrane may be formed from any suitable thermoplastic polyurethane material or a different viscoelastic polymer material, provided it is optically clear, has a glass transition temperature below the usual operating range of the lens, typically below about −5° C., an elastic modulus in the range 10-200 MPa, is inert and non-toxic, exhibits low microbial growth and is capable of being bonded to the rings 18, 20.

In the present embodiment the outer face 14 of the membrane 12 is coated with a protective layer of a barrier material (not shown) for the purpose described below. Any suitable hydrophobic coating material may be used, e.g. a fluorinated polymer. The coating material should be capable of adhering well to the membrane 12. It should be non-yellowing, and the barrier layer should be as thin as possible. In some embodiments, the barrier layer may have a thickness of about 10 nm, but those skilled in the art will appreciate that the thickness may be varied according to the nature of the coating material used and the desired properties of the lens assembly 10. In one embodiment, a fluorine based polymeric homologue of PTFE that is commercially available from Canon Optron, Inc. under the trade mark OF 210 is used.

In another embodiment, the barrier material comprises a layer of cross-linked polyurethane acrylate, which may optionally include a nanoparticulate silica filler as described in more detail below. In this other embodiment, the layer has a thickness of about 1 μm, but again this may be varied according to the nature of the coating material and the desired properties of the lens assembly 10. Thus, in alternative embodiments, the barrier layer comprising a silica-filled acrylic-modified polyurethane may have a thickness in the range 0.5-1.5 μm.

The membrane 12 is shaped and dimensioned as a lens, with the outer surface 14 of the membrane 12 serving as an optical surface of the lens. The membrane 12 can be any shape as desired. In some embodiments, the lens 10 may be used in a pair of spectacles, in which case the membrane 12 will be suitably shaped and dimensioned for that application. For instance, the membrane 12 may be circular, or it may be generally oval or rectangular. Numerous different lens shapes for spectacles are known in the art. In the present embodiment, the membrane 12 is generally rectangular, having rounded corners. Only about half of the assembly 10 is shown in FIGS. 2 and 3.

In embodiments, such as the present embodiment illustrated in FIGS. 1 to 3, in which the membrane is non-round, the rings 18, 20 should be bendable out of the plane of the membrane 12, as described in WO 2013/144533, the contents of which are incorporated herein by reference, to cause or allow the membrane to distend or contract spherically in use, or in accordance with another Zernike polynomial of the kind typically prescribed for ophthalmic use. In the present embodiment, the rings 18, 20 are fabricated from a sheet of stainless steel; the front ring 18 has a thickness of about 0.25 mm and the rear ring 20 a thickness of about 0.15 mm. In embodiments in which the membrane 12 is circular, the rings 18, 20 are not required to be bendable; the membrane may be held by a rigid peripheral support structure, which is more convenient for holding the membrane 12 under tension.

The membrane 12 is glued between the front and rear rings 18, 20. Suitable adhesives are known to those skilled in the art such, for example, as light curable adhesives. In the present embodiment, Delo® MF643 UV curing epoxy adhesive is used.

The rear ring 20 is glued to a peripheral lip 22 of a dish-shaped receptacle 24. The same adhesive may be used as for attaching the rings 18, 20 to the membrane 12. The dish-shaped receptacle 24 comprises a rear wall 26 having a shape that corresponds to the shape of the membrane 12 and a peripheral side wall 28 that extends forwardly of the rear wall and terminates in said peripheral lip 22. The dish-shaped receptacle is made of a flexible, transparent thermoplastic polyurethane such, for example, as Tuftane® (available from Messrs. Permali Gloucester Ltd, Gloucester, UK) and is about 50 μm thick; other similar transparent materials may be used, e.g., DuPont® boPET (biaxially-oriented polyethylene terephthalate) and the thickness adjusted accordingly.

In some embodiments, the assembly 10 may comprise an annular support disc (not shown) of the kind described in WO 2013/143630, the contents of which are incorporated herein by reference, that is interposed between the rear ring 20 and the lip 22 for reinforcing the rings 18, 20 against unwanted "in-plane" buckling under the tension in the membrane 12. In the other embodiment mentioned above, in which the membrane 12 is coated with a layer of silica-filled cross-linked polyurethane acrylate, the annular supporting disc may be omitted.

The rear wall 26 of the dish-shaped receptacle 24 has a rear face 30 (see FIG. 3) that is bonded to a planar front face 32 of a rear lens 34 of fixed refractive power. The rear lens 34 is a meniscus lens having a concave opposite rear face 36. The rear face of the dish-shaped receptacle 24 is bonded contiguously to the front face 32 of the rear lens 34 by means of a transparent pressure-sensitive adhesive (PSA) such, for example, as 3M® 8211 adhesive. In the present embodiment, a layer of PSA about 25 μm thickness is used, but this may be varied as required.

The dish-shaped receptacle 24, rear ring 20 and membrane 12 thus form a sealed enclosure 54. The enclosure 54 is filled with an incompressible fluid 60 through a fill-port (not shown) let into the side wall 28 of the dish-shaped receptacle 24. In the present embodiment, the fluid is pentaphenyltrimethyltrisiloxane, which is a phenylated siloxane, but other suitable silicone oils and other fluids are available to those skilled in the art. The fluid should be colourless, with a high refractive index of at least 1.45 or 1.5. In the present embodiment, the fluid has a refractive index of about 1.58±0.02; it should have low toxicity and low volatility; it should be inert and exhibit no phase change above about −10° C. or below about 100° C. The fluid should be stable at high temperatures and exhibit low microbial growth. Generally the fluid has a density of about 1 g/cm3. As described in detail below, the enclosure 54 is filled with the fluid 60 under vacuum to ensure no air is present. Further, the enclosure 54 may be over-filled to distend the membrane 12 slightly to ensure the enclosure 54 is filled completely with the fluid 60, such that the fluid contacts whole of the inner face 16 of the membrane 12 continuously, with no gaps between the membrane 12 and the fluid 60.

The filled enclosure 54 is compressible owing to the flexibility of the side wall 28 of the dish-shaped receptacle 24 and the elasticity of the membrane 12. Compressing the enclosure against the rear lens 34 causes the side wall 28 of the dish-shaped receptacle 24 to buckle, which in turn causes the membrane to distend outwardly to accommodate the incompressible fluid 50, thereby changing the curvature of the membrane as disclosed, for example, in WO 2013/144533.

The rear lens 34, dish-shaped receptacle 24, rings 18, 20 and membrane 12 are accommodated within a housing 40 comprising a front retainer 48 and a rear retainer 46 that are made of metal and glued together at 47 to form an internal recess in which the rear lens 34, dish-shaped receptacle 24, rings 18, 20 and membrane 12 are received. The rear retainer 46 has a circumferential side wall 43 having an inner surface 44 that is formed with an intermediate step 42. The rear lens 34 is glued to the inner surface 44 towards a rear end of the rear retainer 46, such that the front face 32 of the rear lens 34 is level with said step 42, where the inner surface 44 of the side wall 43 is stepped outwardly to provide a clearance between the side wall 28 of the dish-shaped receptacle 24 and the inner surface 44 forwards of the step 42 to accommodate the side wall 28 as it buckles in use, as well as parts of a control mechanism (omitted from the drawings for simplicity) for selectively compressing the filled enclosure 54 against the rear lens 34 in the manner described above.

The front retainer has a turned-in front rim 50 that is spaced forwardly of the rings 18, 20 and membrane 12 to allow the membrane to distend forwardly in use.

Depending on the shape of the membrane 12, the rings 18, 20 may be hinged to the housing 40 at one or more hinge points as disclosed in WO 2013/144533 or WO 2013/144592, the contents of which are incorporated herein by reference. The control mechanism may include one or more actuators that are mounted to the housing 40 in engagement with the rings 18, 20 (or parts attached to the rings) at predetermined control points around the rings 18, 20 to move the rings towards or away from the rear lens 34 at the control points, as disclosed in WO 2013/144592 or WO 2015/044260, the contents of which are incorporated herein by reference. In this way, the assembly may be selectively actuated to cause the membrane to distend outwardly or contract inwardly in relation to the enclosure to control the curvature of the outer face 14 of the membrane 12.

The assembly 10 thus forms a compound lens with a number of internal and external optical surfaces. The total refractive power of the assembly 10 is determined by the curvature of the rear surface 36 of the fixed rear lens 24 and the curvature of the outer face 14 of the membrane 12. Preferably the materials for the membrane 12, the dish-shaped component 24 and fluid 60 are selected to have as closely as possible the same refractive index, so that the interfaces between the membrane 12 and the fluid 60, and between the fluid 60 and the rear wall 26 of the dish-shaped component are almost invisible to the eye when viewed through the assembly 10.

The membrane 12 is held under tension to stabilise it against deformation. An untensioned or inadequately tensioned membrane would be susceptible to external vibrations, to inertial effects when subjected to acceleration or deceleration in use, and to external forces such as gravity. When used in a pair of eyeglasses, for example, the membrane 12 is subject to continual movement and is worn in in a generally upright orientation which gives rise to a hydrostatic pressure gradient in the fluid 60. In order to minimise distortion of the optical surface provided by the membrane 12, and any consequential optical aberration, it is necessary to hold the membrane 12 under tension between the front and rear rings 18, 20. In accordance with the present invention the membrane 12 is held at a surface tension of at least about 180 N/m, preferably at least 200 N/m.

Further, as mentioned above, the surface tension in the membrane 12 should be stable enough over the working life of the assembly 10 and environmental conditions to provide a substantially constant load in the balance of forces between the tension in the membrane 12 on the one hand and the beam bending reaction force of the rings 18, 20, the pressure of the fluid 60, the force at the control points and/or hinge points mentioned above and any parasitic forces (such as from the receptacle 24, or friction).

Figure 4:
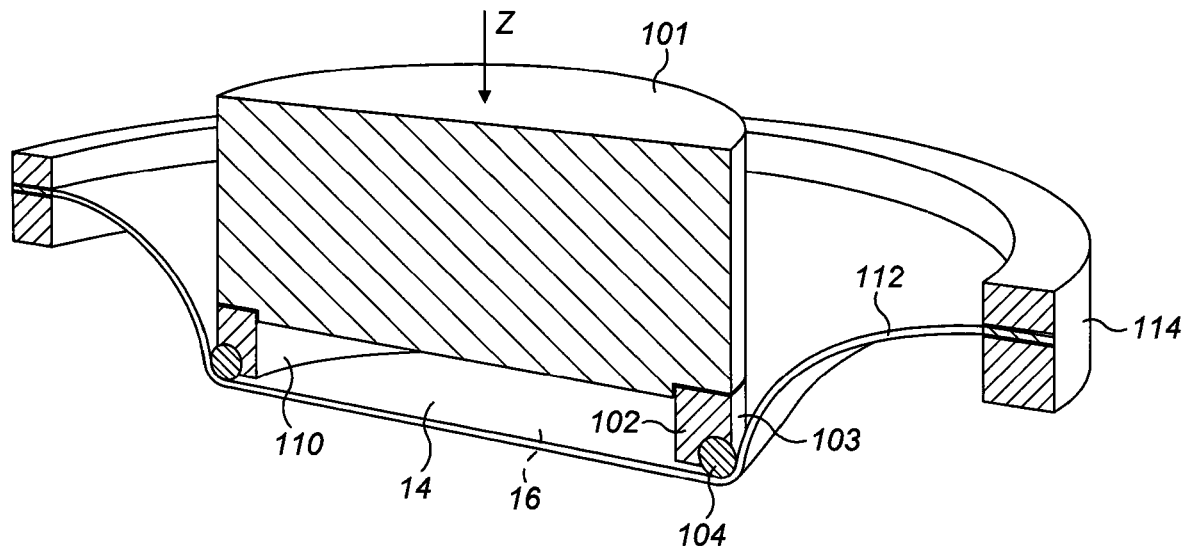
FIG. 4 is a schematic perspective view of a thin sheet of viscoelastic material mounted on a circular clamp and a press for stretching the sheet, shown in cross-section.

FIGS. 4 and 5 illustrate schematically a method in accordance with the present invention for pre-tensioning the membrane 12 to a tension of at least 180 N/m, conditioning the membrane 12 such that it holds this load stably for an extended period of time and assembling the assembly 10 incorporating the pre-tensioned membrane 12. In some embodiments using the method of the invention, the membrane 12 may hold a substantially constant surface tension of at least 180 N/m for a period of at least 12 months.

Figure 5A:
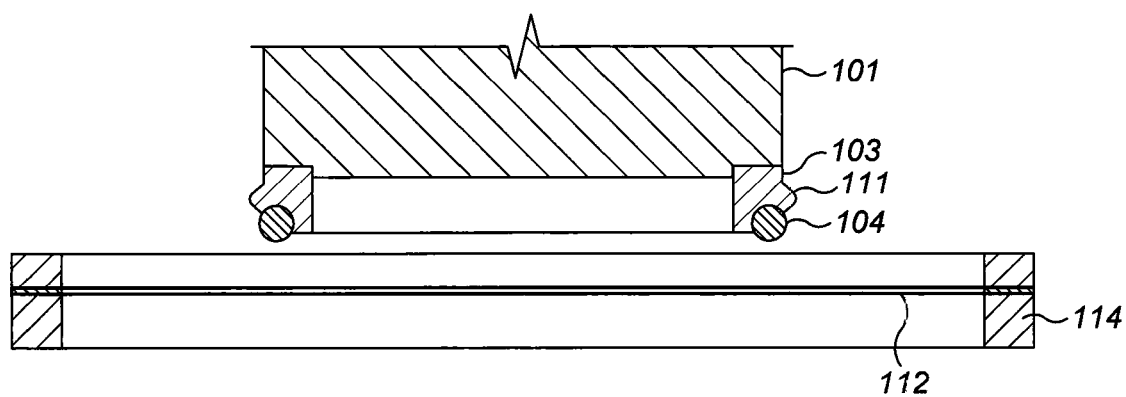
FIGS. 5A-5L show a sequence of steps for assembling an adjustable fluid-filled lens assembly with a biaxially tensioned membrane in accordance with the present invention.

With reference to FIG. 5A, a sheet 112 of polyether polyurethane Elastollan® 118510A as mentioned above, having a sheet thickness of about 380 μm is held in a circular clamp 114 to define a circular area of the sheet within the clamp. The clamp is fixedly secured by a jig (not shown) directly beneath a selectively operable press 101 with the sheet 112 arranged horizontally. The press 101 is releasably fitted with an annular inner carrier ring 102 having a cylindrical outer surface 103 that is formed with an intermediate, circumferential rib 111 (best seen in FIGS. 5A-C; omitted from FIG. 4 for clarity) and carries a first PTFE O-ring 104 at its lower extremity. The outer diameter of the first O-ring 104 is approximately half the inner diameter of the clamp 114, although this ratio is not important; it is only necessary that the first O-ring should fit through the middle of the clamp 101 and protrude through it sufficiently for the following steps to occur. The inner carrier ring 102 also has a cylindrical inner surface 110.

Figure 5B:
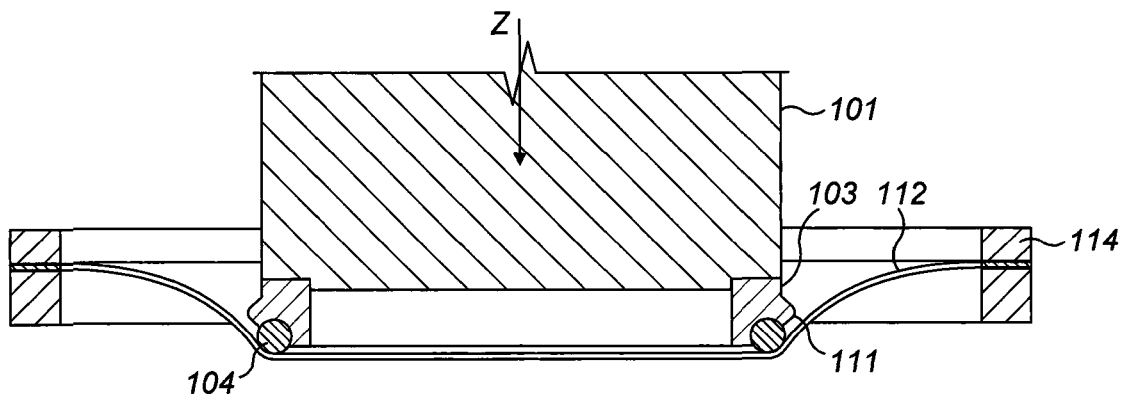
Figure 5C:
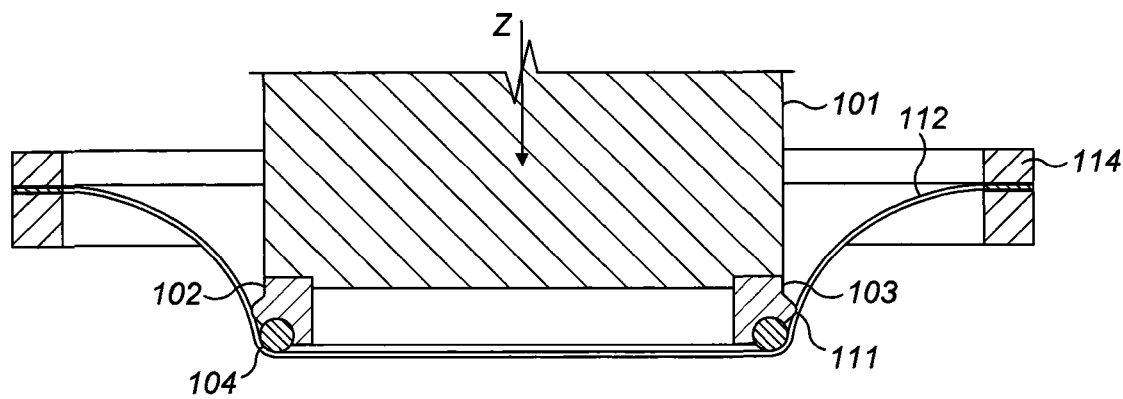
Figure 6A:
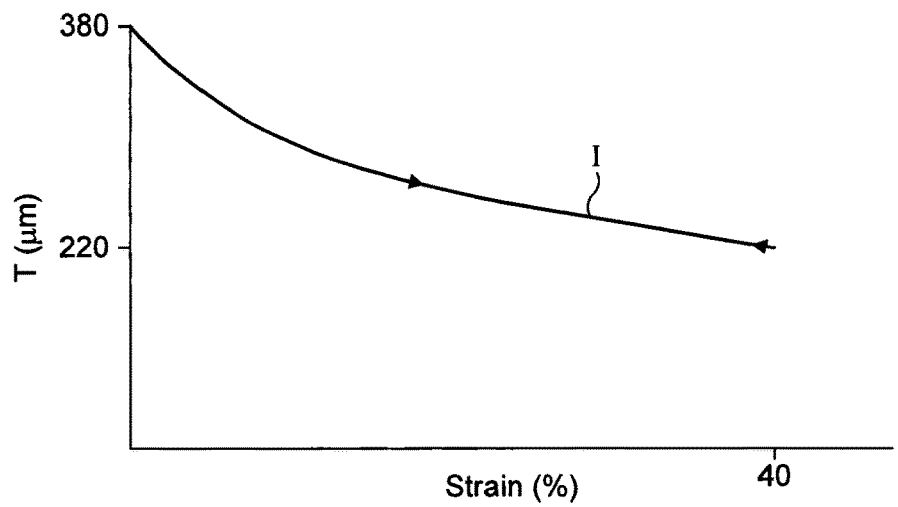
FIGS. 6A, 6B and 6C are illustrative graphs based on empirical data showing respectively the change in thickness (in μm), tension (in N/m) and stress (in MPa) of the membrane during the principal manufacturing steps.
Figure 6B:
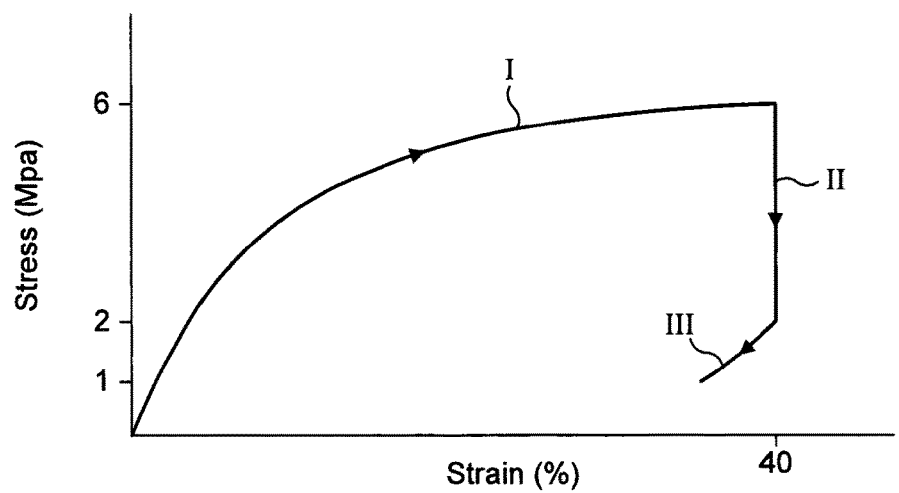
Figure 6C:
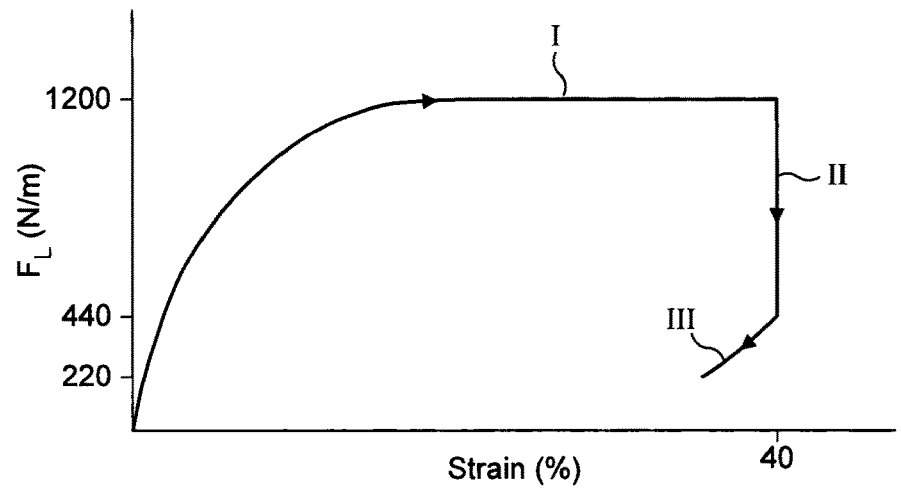

With the clamp 114 and sheet 112 in position, the press 101 is operated to move the press downwards in the direction of arrow Z in FIG. 5B (see also FIG. 4) first to engage with the sheet 112 and then to stretch the sheet 112. The stretching of the sheet 112 is facilitated by the first O-ring 104, which is suitably made from a low friction material such, for example, as PTFE, to ensure the sheet slides easily over the press 101 and is tensioned uniformly. The press 101 is moved downwards against the sheet 112 until the sheet is strained by about 40% to a biaxial tension of about 1200 N/m at the end of the stroke of the press. The sheet 112 becomes thinner as it stretched, reaching a thickness of about 220 μm corresponding to a stress of about 6 MPa, as shown in FIG. 5C. FIG. 6A shows how the thickness (in μm) of the sheet 112 changes as it is strained to about 40%. FIGS. 6B and 6C show respectively the corresponding changes of stress (in MPa) and load (in N/m). The plot-lines in FIGS. 6B and 6C have a plurality of distinct legs. Leg I represents the change in stress/load during the tensioning of the sheet as described above.

Figure 5D:
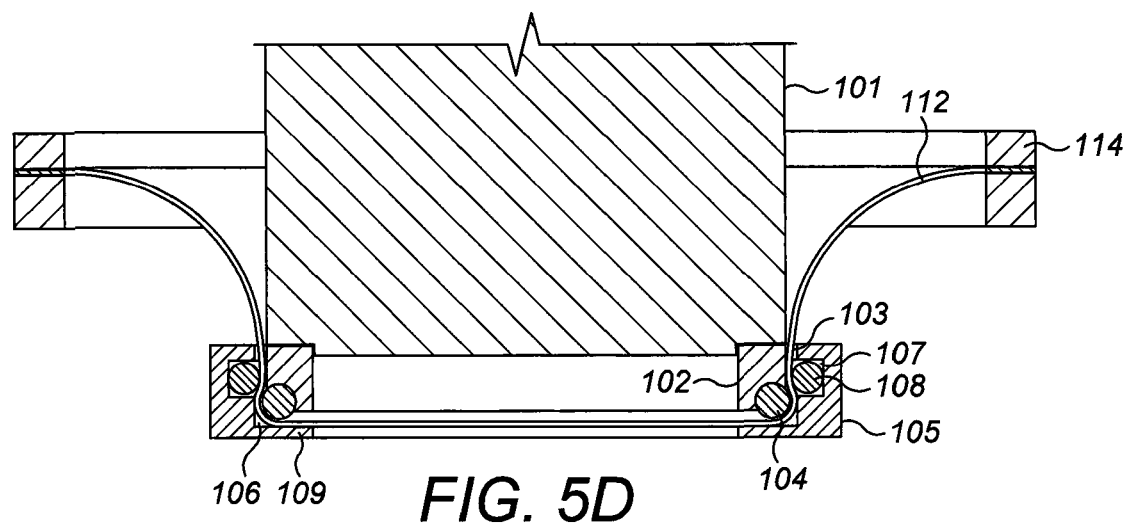

Once the sheet 112 is stretched to its target tension, the inner carrier ring 102 is engaged with an outer carrier ring 105, as shown in FIG. 5D. The outer carrier ring 105 is annular having an inner surface 106 that is slightly greater than the outer diameter of the inner carrier ring 102, so that the inner carrier ring 102 forms snug fit inside the outer carrier ring 105. The outer carrier ring 105 is held fixedly by the jig such that the inner carrier ring 102 is entered into the outer carrier ring 105 as the press 101 is moved downwards. The inner surface 106 has a circumferential groove 107 that accommodates a second friction fluoroelastomer (e.g.

Viton®) or Nitrile rubber O-ring 108 having an inner diameter that is slightly smaller than the outer diameter of the circumferential rib 111 formed on the outer surface 103 of the inner ring 102, so that on engaging the outer ring 105 with the inner ring 102 at the end of the stroke, the second O-ring 108 bumps over the ridge 111 to trap the membrane 112 between the second O-ring 108 and the inner carrier ring 102. An end stop 109 on the outer ring 105 prevents the inner and outer carrier rings 102, 105 from separating from one another.

Figure 5E:
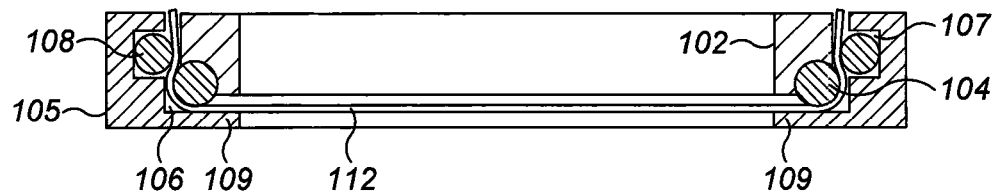

The portion of the sheet 112 that is held by the inner and outer carrier rings 102, 105 is then severed from the remainder of the sheet as shown in FIG. 5E. The inner and outer carrier rings 102, 105, with the trimmed sheet 112 held firmly between them under tension are then transferred to an oven having a temperature of about 80° C. The sheet 112 is conditioned in the oven for about 1 hour, during which time the macromolecular structure of polyurethane material comprising the sheet 112 relaxes. As shown by leg II in FIGS. 6B and 6C, during this step the stress in the sheet relaxes to about 2 MPa and the tension falls to about 440 N/m. The temperature and duration of the thermal conditioning step may be altered, provided that the sheet 112 is caused or allowed to undergo stress relaxation. It has been found that after this step the sheet is surprisingly able to hold a substantially constant line tension of about 200 N/m for a period of several years. Temperatures above about 90° C. should be avoided as the polyurethane material may begin to degrade.

Figure 5F:
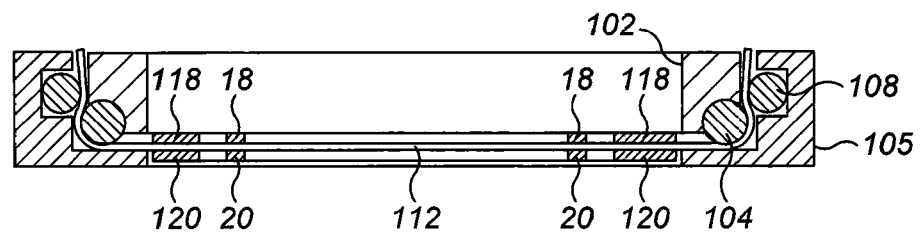
Figure 5G:
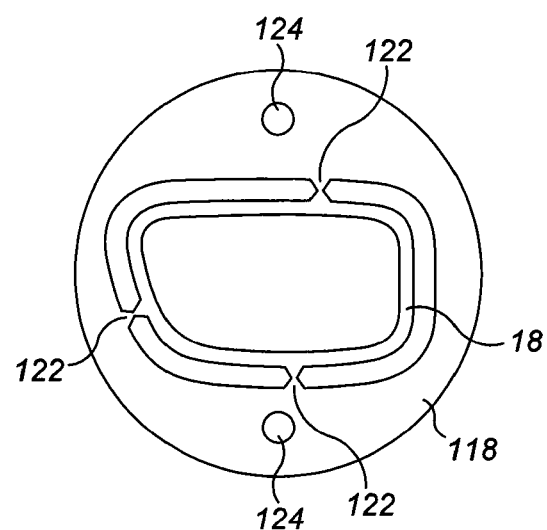

The inner and outer rings 102, 105 are then removed from the oven and the front and rear rings 18, 20 are glued to the front and rear surfaces 14, 16 of the sheet respectively using a light curable epoxy adhesive as mentioned above. Each of the rings 18, 20 is fabricated integrally with a respective circular lead frame 118, 120 and is attached to the rest of the lead frame by severable tabs 122, as shown in FIG. 5G. Each of the lead frames 118, 120 has an outer diameter that is slightly smaller than the diameter of the inner surface 110 of the inner carrier ring such that it fits snugly within the inner carrier ring 102, as shown in FIG. 5F, to locate the rings 18, 20 accurately with respect to the sheet 112 and each other. The lead frames 118, 120 are provided with location features 124 to assist further in positioning them accurately within the inner carrier ring 102. For convenience the epoxy adhesive s applied to the whole of the lead frames 118, 120 and then cured after being positioned in contact with the sheet 112. For the epoxy adhesive used, a two-stage curing process is needed; after initiation with UV light, the adhesive is then subjected to a secondary thermal curing step in an oven at about 40° C., for about 12 hours to develop the adhesive's full strength. If an alternative adhesive is employed then it should be cured according to the manufacturer's instructions.

In some embodiments, the rear ring 20 may be attached to an annular support disc (not shown) of the kind described in WO 2013/143630 for reinforcing the rings 18, 20 against the tension in the sheet 112 in the plane of the sheet. The support disc is not shown here for clarity. Typically the rings 18, 20 have protruding tabs (not shown) at predetermined locations around the rings 18, 20 for connecting the rings at those locations to the housing 40 at hinge points, or to the control mechanism at actuation points, as described in WO 2013/144533, WO 2013/144592 or WO 2015/044260. The tabs are also omitted from the drawings for simplicity.

In the one embodiment, the outer face 14 is then coated with a thin layer (not shown) of the fluorinated polymer barrier material (OF 210™, Canon Optron, Inc) to form a protective layer as described above. The barrier material is coated onto the outer face 14 under vacuum by physical vapour deposition (PVD) to a thickness of about 10 nm.

A fluorinated polymer barrier layer that is coated onto the outer face 14 by PVD deposition is satisfactory for use in many situations, but a disadvantage is that there are no interfacial bonds between the outer face 14 of the membrane and the polymer coating. As a result, the PVD coating may be fragile with a risk of wearing off, for instance by touch. In the other embodiment mentioned above, the outer face 14 of the mounted pre-tensioned membrane 12 is coated with a layer of silica-filled cross-linkable polyurethane acrylate material instead of the fluorinated polymer material. The use of a barrier material that is compatible with the membrane material allows the formation of strong interfacial bonds between the barrier layer and the membrane 12 as result of interactions at the molecular level. An aromatic polyurethane acrylate material, for example, may be suitable for coating a thermoplastic aromatic polyurethane membrane 12. The inclusion of acrylate moieties within the barrier material allows the barrier material to be cross-linked after coating onto the membrane 12 for increased stiffness and hardness. The inclusion of a small amount of photoinitiator within the material allows curing to proceed by exposure to UV light.

Suitable acrylic-modified polyurethane materials include UV1 and Ceranoshield, which are commercially available from PPG Industries, Inc. Barberton Speciality Chemicals Plant, Barberton Ohio, and G-NT200 which is available from Lens Technology International of La Mirada Calif.

The inclusion of silica nanoparticles affords added stiffness and scratch resistance. The concentration of nanoparticulate silica included in the barrier material may be varied according to the desired properties of the coating, but typically the barrier material contains 50-60% wt. silica. In one embodiment, the acrylic-modified polyurethane material may include about 52% wt. silica. If a thinner barrier layer is desired, the silica-filled polyurethane barrier material may be diluted with a suitable solvent such, for example, as an acetate or alcohol, prior to application to the face of the membrane 12 as described below, which may reduce the concentration of silica particles to the range 7-10% wt. which would still be sufficient to impart a degree of hardness to the coating. Generally in accordance with the invention, the nanoparticles may have an average diameter in the range 50-200 nm, typically about 50-100 nm.

The acrylate-modified polyurethane barrier material may be applied to the outer face 14 of the mounted membrane 12 by spin coating, but preferably ultrasonic spray coating is used, which has been found to achieve a thickness well below about 1 μm. The use of ultrasound causes the polyurethane barrier material to be atomised into tiny droplets, which are then sprayed over the face 14 of the membrane 12 in the form of a thin film.

Thermoplastic polyurethane of the kind used for the membrane 12 is hydrophobic in nature and has a contact angle ranging between 95-105°. A lower contact angle is generally needed to wet the surface uniformly to promote good adhesion between the face 14 of the membrane 12 and the barrier layer. In order to attain a lower contact angle and better adhesion, the outer face 14 of the membrane 12 is subjected to plasma treatment (air plasma) prior to coating with the barrier material. This serves to activate the surface and, as a result, the contact angle is reduced to the region of 78-83°. This may be tested using dyne ink, whereby the surface energy after plasma exposure is increased from 38-40 dynes/cm to about 48-52 dynes/cm.

After activating the face 14 of the membrane 12 as described above, the pre-tensioned membrane 12, still mounted between the inner and outer rings 102, 105, is transferred to a coating chamber where the coating of silica-filled acrylate-modified polyurethane is sprayed onto the face 14 by ultrasound spray coating as mentioned above. After coating, the coating liquid on the membrane 12 is cured under UV exposure using Mercury vapour H-bulb. The mercury lamp has an output in the shortwave UV range between 220-320 nm, and a spike of energy in the long-wave range at 365 nm.

A cured, silica-filled polyurethane coating of the kind described above provides a stiff, hard barrier layer on the outer face 14 of the pre-tensioned membrane 12 having elastic modulus of about 1 GPa. This provides an additional advantage as described in more detail below, in that as the tension in the membrane 12 decreases slightly during the subsequent assembly steps, the barrier layer is compressed.

In other embodiments, the mounted membrane may be coated on its outer face additionally or instead with other coating materials known in the art such, for example, as single or multi-layer anti-reflection coatings.

Figure 5H:
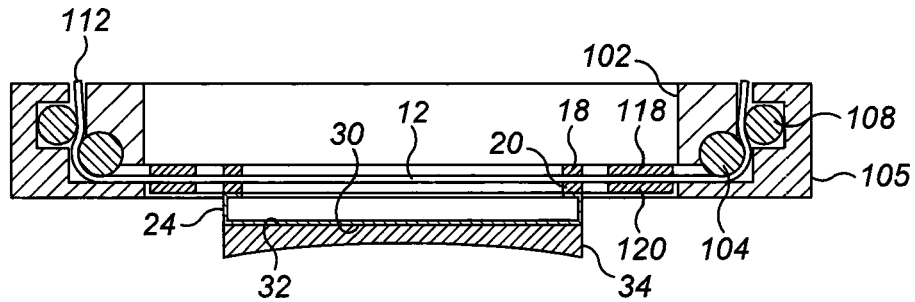
Figure 5I:
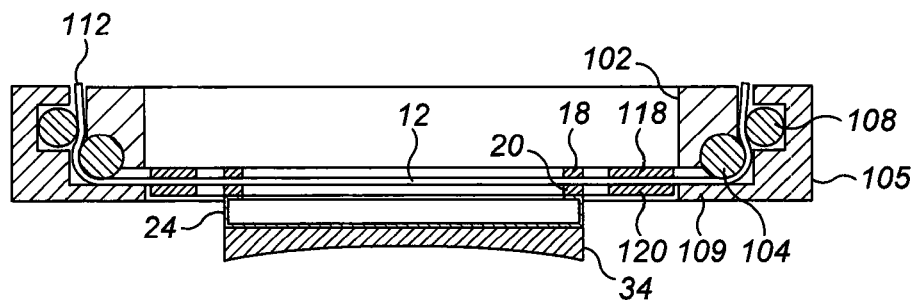

The dish-shaped receptacle 24 is pre-assembled with the rear lens 34 by bonding the front face 32 of the lens 34 to the rear face 30 of the receptacle 24 using a 25 µm layer of PSA as mentioned above. The pre-assembled lens 34 and receptacle 24 are then attached to the rear ring 20 as shown in FIG. 5H by bonding the peripheral lip 22 of the receptacle 24 to the rear ring 20 with the epxoy adhesive and curing the same. The sheet 112 is then trimmed between the rings 18, 20 and the lead frames 118, 120 as shown in FIG. 5I leaving the membrane proper 12 held between the rings 18, 20. At this stage, the rings 18, 20 are still attached to the lead frames 118, 120 by the tabs 122.

Figure 5J:
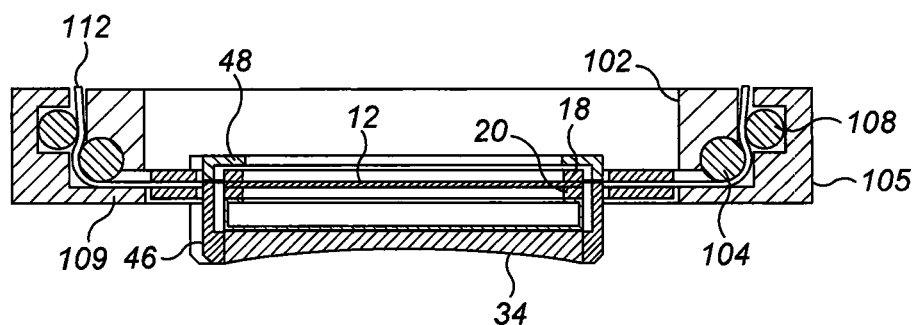
Figure 5K:
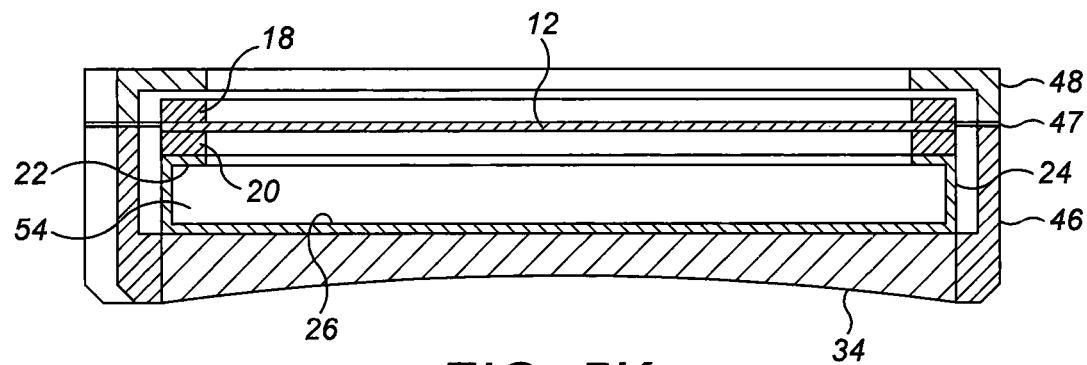

With reference to FIG. 5J, the front and rear retainers 48, 46 are then assembled around the rear lens 34, dish-shaped receptacle 24 and rings 18, 20 and membrane 12 to enclose the rear lens 34, dish-shaped receptacle 24 and rings 18, 20 and membrane 12 as described above and to form said housing 40. The tabs 122 between the lead frames 118, 120 and the rings 18, 20 are then cut to detach the assembly 10 from the jig, as shown in FIG. 5K.

Figure 5L:
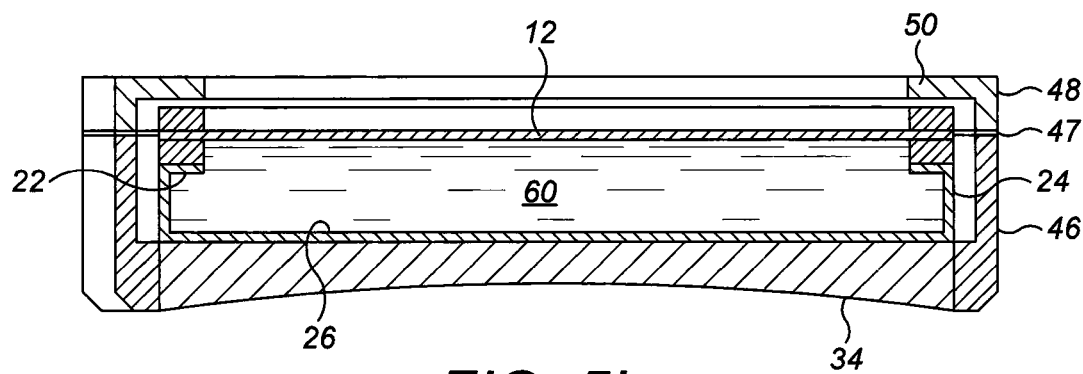

Thereafter the enclosure 54 formed by the rear wall 26 of the dish-shaped receptacle 24, the membrane 12 and the rear ring 20 is filled under vacuum with pentaphenyltrimethyltrisiloxane as the fluid 60 through a fill-port (not shown) in the housing 40 and side wall 26 of the dish-shaped receptacle 24. As described above, alternative silicone oils may be used instead if desired. Filling is continued until the fluid 60 contacts the whole of the inner face 16 of the membrane 12 continuously as shown in FIG. 5L. Desirably the enclosure may be over-filled to a certain degree, causing the membrane 12 to distend outwardly. Suitably the enclosure may be over-filled to a membrane curvature of about +1.0 dioptres. This serves to stabilise the loaded membrane support structure comprising the rings 18, 20 and allows for absorption of some of the fluid 60 by the membrane 12.

Over time the membrane 12 tends to absorb an amount of the fluid 60 from the enclosure via its inner face 16 which is in contact with the fluid 60. In the present embodiment, the membrane 12 may absorb up to about 15% of its weight of fluid. This causes the membrane 12 to swell-relax, further losing tension. Desirably this process may optionally be accelerated in accordance with the present invention by incubating the fluid-filled assembly 10 at about 50-51° C. for about 24 hours. This is shown in leg III of FIGS. 6B and 6C, with the final tension in the membrane being about 220 N/m and the final stress being about 1 MPa, which is equivalent to a strain reduction of about 5%. During this process the curvature of the membrane also decreases from about +1.0 dioptres, as mentioned above, to about +0.5 dioptres. In this way, the membrane tension in the finished assembly 10 is already substantially stabilised.

Where the membrane 12 carries a silica-filled, cross-linked polyurethane coating having elastic modulus of about 1 GPa on its outer face 14 as described above in relation to the other embodiment, the coating is compressed when the membrane and rings sub-assembly 12, 18, 20 is released from the lead frames 118, 120 by cutting tabs 122, and thus the elastic forces in the coating operate in the opposite direction to the elastic forces in the membrane 12 which is tensioned.

The change in stress $\sigma_m$ of a biaxially strained membrane of modulus $E_m$ subject to a small strain $\varepsilon$ is given by equation (I):

$$\Delta\sigma_m = 2E_m\varepsilon \qquad (I)$$

As the membrane 12 relaxes during incubation and swelling, it undergoes a negative "settling" strain that reduces its tension, while putting the coating into compression. The line tension in the membrane 12 is equal to the stress $\sigma_m$ in the membrane multiplied by its thickness $T_m$. The negative strain serves to put the membrane 12 and coating into equal and opposite line tensions:

$$T_m(\sigma_m - 2E_m\varepsilon) = 2T_cE_c\varepsilon \qquad (II)$$

where $T_c$ and $E_c$ are the thickness and modulus of the coating respectively.

Applying equation (II) to a membrane 12 having a thickness $T_m$ of about 200 µm and a modulus $E_m$ of about 20 MPa at an initial biaxial stress of about 1 MPa and a coating having a modulus $E_c$ of about 1 GPa, the settling strain would be limited to about 1% with a coating having a thickness $T_c$ of about 6 µm. In this way, the force applied to the rings 18, 20 would be minimised to alleviate unwanted in-plane bending of the rings 18, 20 without the need for an annular support desk of the kind described in WO 2013/143630 for example. In the other embodiment, the coating has a thickness of about 1 µm, but even at this thickness, the compression of the coating is enough to have a significant effect on the mechanics of the membrane 12 such that it serves to prevent some or all of the tendency of the rings 18, 20 to in-plane collapse.

The protective layer on the outer face 14 of the membrane 12 prevents the egress of absorbed fluid 60 from the front face of membrane. Such egress would be undesirable as the fluid 60 might form droplets on the surface of the membrane 12 thus impairing its optical properties.

Figure 7:
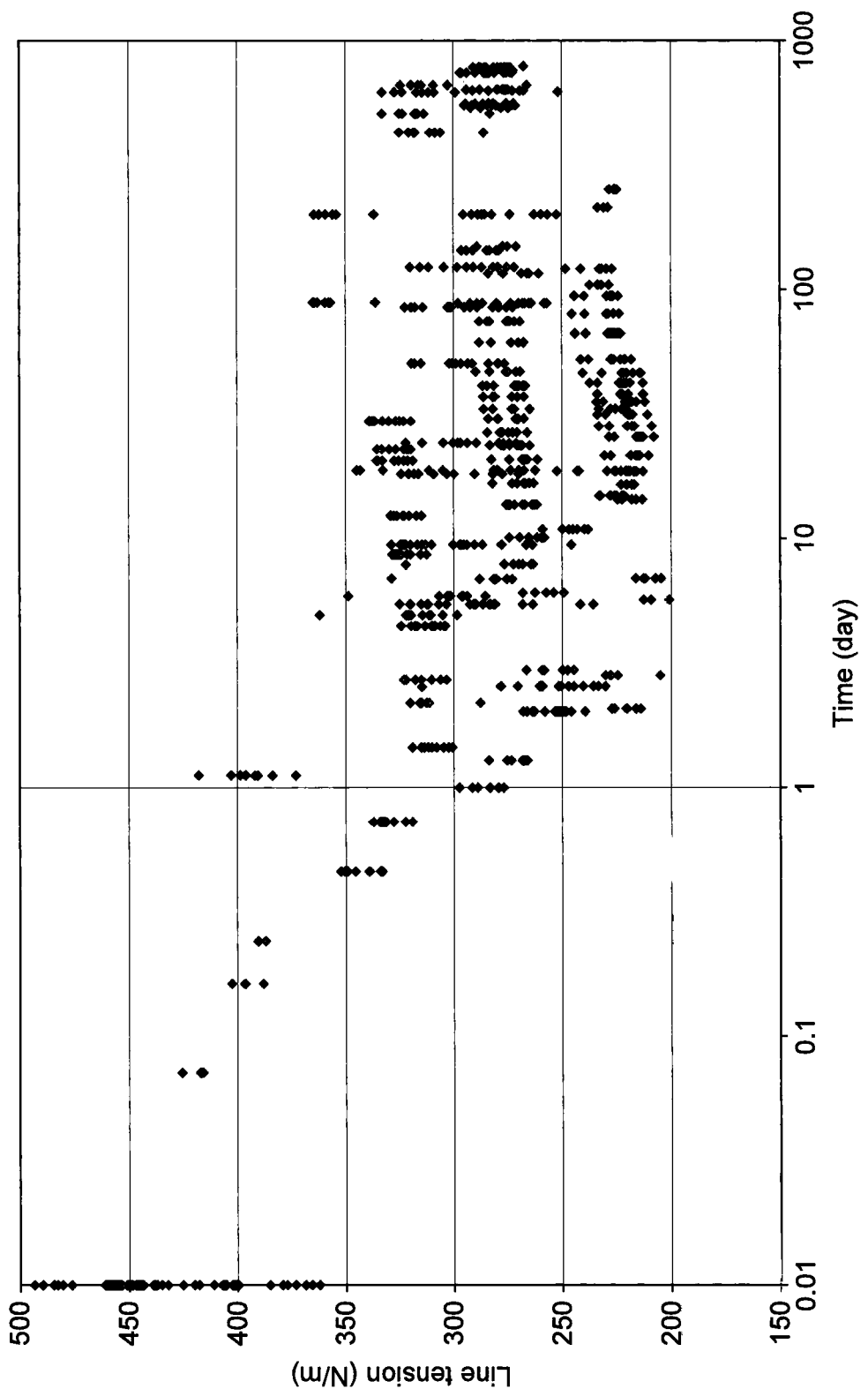
FIG. 7 is a scattergram of the measured line tensions with time for sixty-six individual polyurethane membranes that have been tensioned and thermally conditioned in accordance with the present invention and held in continuous contact with a body of silicone oil.

FIG. 7 shows a scattergram of measured line tensions over time for sixty-six individual polyurethane membranes that have been tensioned and thermally conditioned in accordance with the invention and held in continuous contact with a body of silicone oil. As can be seen, the membranes hold the tension substantially constant for an extended period of more than two years (FIG. 7 shows up to 796 days). It is likely that the membranes are able to hold the tension substantially constant for even longer, but that has not yet been measured.

In yet another embodiment, the inner face 16 of the membrane 12 may be coated with a barrier layer (not shown) of a suitable hydrophobic coating material of the kind described above for use on the outer face 14. In this way, the ingress of fluid 60 into the membrane 12 may be prevented or at least retarded. In such a case, the manufacturing process would not need to accommodate swell-relaxing of the membrane 12 owing to the absorption of fluid 60 avoiding the need to incubate the filled assembly at an elevated temperature to accelerate swell-relaxing of the membrane and it may be possible to biaxially tension the membrane 12 to a slightly lower initial tension.

The effective modulus $E_{ef}$ of a membrane having a modulus $E_n$, carrying a coating having an elastic modulus $E_c$ is given by the equation:

$$E_{eff} = \frac{E_m T_m + E_c T_c}{T_m + T_C} \quad (III)$$

The thickness of the coating may be measured optically, while the combined thickness $T_m + T_c$ of the membrane and coating may be measured using a thickness gauge.

The modulus of the membrane when coated and uncoated may be measured by holding the membrane around its edge in steel rings clamped to a sealed vessel that is pressurised to a pressure P. As a result of pressure in the vessel, the membrane bulges outwardly, and the maximum outward displacement h of the membrane can be measured using a laser height measuring system. From this, the tension, biaxial stress and strain on deforming the membrane from flat to nearly spherical, and hence the effective modulus of the coating and membrane, or of the membrane only, can be calculated.

The invention claimed is:

1. A method of assembling an adjustable fluid-filled lens assembly comprising:
   biaxially tensioning a thermoplastic elastomeric membrane to an initial surface tension of at least 450 N/m;
   while the membrane is biaxially tensioned, thermally conditioning the tensioned membrane to accelerate relaxation of the membrane to a residual surface tension that is lower than the initial surface tension and is in the range of from 180 to 550 N/m;
   mounting the conditioned membrane to a peripheral support structure whilst maintaining the residual surface tension in the membrane;
   assembling the mounted membrane with one or more other components to form an enclosure with the conditioned membrane forming one wall of the enclosure; and
   filling the enclosure with a fluid to produce the adjustable fluid-filled lens assembly.

2. The method as claimed in claim 1, wherein the membrane is biaxially tensioned to an initial surface tension of at least 1000 N/m.

3. The method as claimed in claim 1, wherein the membrane is conditioned at a temperature of at least 70° C. for at least 30 minutes.

4. The method as claimed in claim 1, wherein the membrane is coated on at least one face with a barrier material to form a barrier layer that serves to prevent or retard the passage of fluid.

5. The method as claimed in claim 4, wherein the membrane is coated on an outer face that is arranged outside the enclosure in the finished assembly, not in direct contact with the fluid in the enclosure.

6. The method as claimed in claim 1, wherein the fluid-filled enclosure is incubated at a temperature of at least 40° C. for at least 12 hours to accelerate absorption of the fluid by the membrane.

7. The method as claimed in claim 4, wherein the membrane is coated on an inner face that contacts the fluid in the finished assembly.

8. The method as claimed in claim 4, wherein the barrier material comprises a hydrophobic polymer.

9. The method as claimed in claim 4, wherein the barrier layer has a thickness of about 20 nm or less.

10. The method as claimed in claim 1, wherein the membrane comprises a polyurethane.

11. The method as claimed in claim 10, wherein the membrane comprises an aromatic polyurethane produced from diphenylmethane 2,2'-, 2,4'- and/or 4,4'-diisocyanate (MDI), a polyether diol having molecular weight of from 500 to 12,000 g/mol, and an alkanediol having from 2 to 10 carbon atoms in the alkylene radical; wherein the ratio of the polyetherol to the alkanediol is in the range 10:1 to 1:10.

12. The method as claimed in claim 11, wherein the polyether diol has a melting point of less than about 150° C. and a molecular weight of from 501 to 8000 g/mol and the alkanediol has a molecular weight of from 62 g/mol to 500 g/mcl; wherein the molar ratio of the alkanediol to the polyether diol is less than 0.2.

13. The method as claimed in claim 12, wherein the aromatic polyurethane is formed from diphenylmethane-4,4'-diisocyanate (MDI), polytetramethylene glycol and 1,4-butanediol and has a Shore A hardness of about 85.

14. The method as claimed in claim 1, wherein the fluid has a refractive index of at least 1.45, preferably at least 1.5.

15. The method as claimed in claim 1, wherein the fluid is selected from silicone oils, siloxanes and phenylated siloxanes.

16. The method as claimed in claim 1, wherein the fluid is pentaphenyltrimethyltrisiloxane.

17. A pair of spectacles comprising at least one adjustable fluid-filled lens assembly comprising: an enclosure, one wall of which is formed by a tensioned elastomeric membrane that is mounted to a peripheral support structure, and which is filled with a fluid; wherein the membrane is saturated with said fluid, is coated on its outer face with a barrier layer to said fluid, and the membrane holds a substantially constant surface tension of at least 180 N/m; wherein the pair of spectacles is assembled by a process comprising:
   biaxially tensioning a thermoplastic elastomeric membrane to an initial surface tension of at least 450 N/m;
   while the membrane is biaxially tensioned, thermally conditioning the tensioned membrane to accelerate relaxation of the membrane to a residual surface tension that is lower than the initial surface tension and is in the range of from 180 to 550 N/m;
   mounting the conditioned membrane to a peripheral support structure-whilst maintaining the residual surface tension in the membrane;
   assembling the mounted membrane with one or more other components to form an enclosure with the conditioned membrane forming one wall of the enclosure; and
   filling the enclosure with a fluid to produce the adjustable fluid-filled lens assembly.

* * * * *